(12) United States Patent
Onaka

(10) Patent No.: US 8,275,269 B2
(45) Date of Patent: Sep. 25, 2012

(54) DISTRIBUTED RAMAN AMPLIFIER AND OPTICAL COMMUNICATION SYSTEM

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 211 days.

(21) Appl. No.: 12/616,839

(22) Filed: Nov. 12, 2009

(65) Prior Publication Data

US 2010/0129081 A1   May 27, 2010

(30) Foreign Application Priority Data

Nov. 21, 2008   (JP) .................................. 2008-297463

(51) Int. Cl.
*H04B 10/02* (2006.01)

(52) U.S. Cl. .......... 398/177; 398/81; 398/147; 398/158; 398/159; 398/160; 398/33; 398/37; 398/38; 398/92; 398/181; 359/334; 359/341.3; 359/337

(58) Field of Classification Search .............. 398/177, 398/180, 181, 173, 38, 33, 79, 158, 159, 398/147, 148, 149, 81, 25, 26, 27, 91, 92, 398/93, 94, 37, 160; 359/334, 341.3, 337.1, 359/341.4, 341.42, 349, 341.41, 337, 337.4
See application file for complete search history.

(56) References Cited

U.S. PATENT DOCUMENTS

| | | | |
|---|---|---|---|
| 6,510,000 B1 | 1/2003 | Onaka et al. | |
| 6,636,659 B2 * | 10/2003 | Kagi et al. | 385/24 |
| 6,657,779 B2 * | 12/2003 | Cavaliere et al. | 359/341.4 |
| 6,760,150 B2 * | 7/2004 | Goto et al. | 359/337.12 |
| 7,145,718 B2 | 12/2006 | Sugaya et al. | |
| 7,394,589 B2 | 7/2008 | Onaka et al. | |
| 7,515,829 B2 | 4/2009 | Mori | |
| 2005/0225843 A1 * | 10/2005 | Sugaya et al. | 359/337.1 |
| 2007/0098411 A1 * | 5/2007 | Ghera et al. | 398/177 |
| 2008/0158658 A1 | 7/2008 | Sugaya | |

FOREIGN PATENT DOCUMENTS

| | | |
|---|---|---|
| JP | 2002-076482 A | 3/2002 |
| JP | 2005-303070 A | 10/2005 |
| JP | 2006-33542 A | 2/2006 |
| JP | 2008-182679 A | 8/2008 |

OTHER PUBLICATIONS

Japanese Office Action mailed Feb. 21, 2012 for corresponding Japanese Application No. 2008-297463, with English-language Translation.

* cited by examiner

*Primary Examiner* — Hanh Phan
(74) *Attorney, Agent, or Firm* — Fujitsu Patent Center (57) ABSTRACT

The distributed Raman amplifier monitors an OSNR of each channel in a WDM light which has been propagated through a transmission path to be Raman amplified, and thereafter, is amplified by an optical amplifier in an optical repeating node; judges whether a monitor value of the OSNR is larger or smaller than a previously set target value thereof; and feedback controls a driving state of a pumping light source which supplies a Raman pumping light to the transmission path, based on the judgment result. The optical communication system comprises the above distributed Raman amplifier in each repeating span thereof, and performs a pumping light control of the distributed Raman amplifier corresponding to the repeating span selected based on the OSNR in each distributed Raman amplifier and the monitor result of span loss. As a result, it becomes possible to effectively improve the OSNR of each channel in the WDM light, and also, to reduce the power consumption.

13 Claims, 8 Drawing Sheets

RELATED ART

FIG.8

RELATED ART

FIG.9

RELATED ART

FIG.10

RELATED ART

DISTRIBUTED RAMAN AMPLIFIER APPLIED WITH ALC

DISTRIBUTED RAMAN AMPLIFIER APPLIED WITH AGC

DISTRIBUTED RAMAN AMPLIFIER AND OPTICAL COMMUNICATION SYSTEM

CROSS-REFERENCE TO RELATED APPLICATION

This application is based upon and claims the benefit of priority of the prior Japanese Patent Application No. 2008-297463, filed on Nov. 21, 2008, the entire contents of which are incorporated herein by reference.

FIELD

The embodiment discussed herein is directed to a distributed Raman amplifier for supplying a pumping light to a transmission path to perform distributed Raman amplification on a wavelength division multiplexed (WDM) light which is propagated through the transmission path, and an optical communication system using the distributed Raman amplifier.

BACKGROUND

In the context of an increase of recent communication traffic, demands for optical communication transmission apparatus have been increased. In recent years, not only an optical repeating node which has been introduced to trunk networks but also the optical communication transmission apparatus have been actively introduced to local networks, and further, optical networks have been formed in subscriber systems. Thus, the optical communication system undertakes an important role in world information networks.

As a typical optical communication system, an optical amplification-repeating transmission system is a mainstream, which arranges an optical repeating node provided with a WDM optical amplifier, such as an erbium doped fiber optical amplifier (EDFA) or the like, on a transmission path, to achieve the high reliability at a low cost and also to realize the large-capacity and long-distance transmission.

Figure 7:
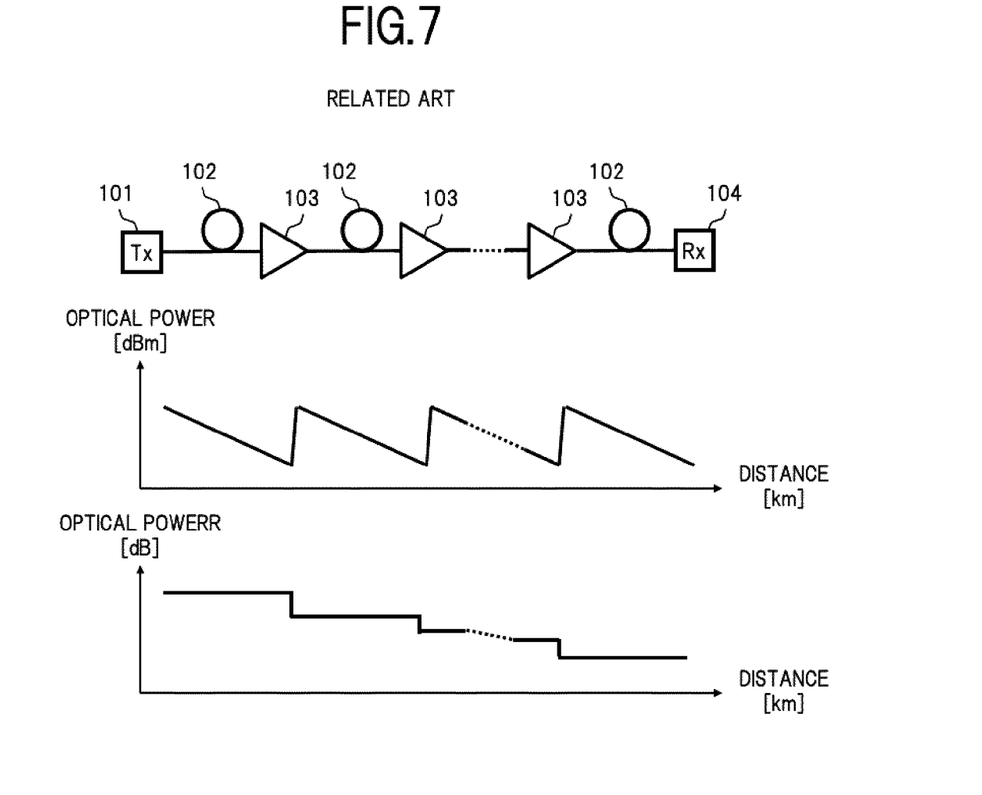
FIG. 7 is a diagram typically illustrating one example of changes in optical power and OSNR according to a transmission distance in a typical optical amplification-repeating transmission system.

FIG. 7 is a diagram typically illustrating one example of changes in optical power and OSNR according to a transmission distance, in a typical optical amplification-repeating transmission system. In the system in FIG. 7, a WDM light is transmitted from an optical transmitter (Tx) 101 to a transmission path 102, and the WDM light which has been propagated through the transmission path 102 to be attenuated, is amplified by an EDFA 103 in an optical repeating node before an optical level thereof becomes lower than a required optical level, to be output to the transmission path in a subsequent repeating span. The attenuation of the WDM light in the transmission path 102 and the amplification thereof in the optical repeating node are repetitively performed, so that the WDM light is repeating-transmitted from the optical transmitter 101 up to an optical receiver (Rx) 104.

In such an optical amplification-repeating transmission system, if an inter-node repeating distance becomes longer, a loss in the transmission path 102 is increased. Further, in the case where various types of functional optical components are arranged on an optical signal transmission route, since losses of the functional optical components are added, the repeating loss is further increased. Therefore, an optical input level to the EDFA 103 in each optical repeating node is decreased, so that an OSNR (Signal-to-Noise Ratio) indicating an intensity ratio between a signal light and a noise light is decreased. Incidentally, an OSNR of a signal light output from the EDFA 103 is typically defined by the following formula (1).

$$OSNR[dB] = \text{signal light level[dBm]} - \text{noise light level[dBm]} \quad (1)$$
$$= \text{optical input level[dBm] to } EDFA$$
$$- NF \text{ (Noise Figure)[dB] of } EDFA - \text{constant}$$

Further, an OSNR of a reception light in the optical receiver 104 (hereafter, the OSNR of the optical signal reaching a reception end is to be referred to as "received OSNR") is the sum of OSNR in each repeating span. Namely, if the OSNR in each span is "OSNRi" (i=1, 2, . . . , n), "OSNRtotal" of the received OSNR can be calculated by the following formula (2).

$$OSNRtotal = \Sigma OSNRi \quad (2)$$

If a span of long repeating intervals is arranged on the transmission route for the optical signal, a value of the received OSNR is decreased under an influence that a value of the OSNR in this span is decreased. If the received OSNR is decreased, a signal waveform is degraded to increase a reception error possibility.

As one measure for avoiding the decrease of received OSNR due to such an increase of repeating loss, it is effective to apply a distributed Raman amplifier (DRA) to each span or the span of long repeating intervals on the system to thereby increase the optical input level to the WDM optical amplifier such as EDFA or the like, so that the received OSNR in the entire system is increased to thereby improve transmission characteristics.

Figure 8:
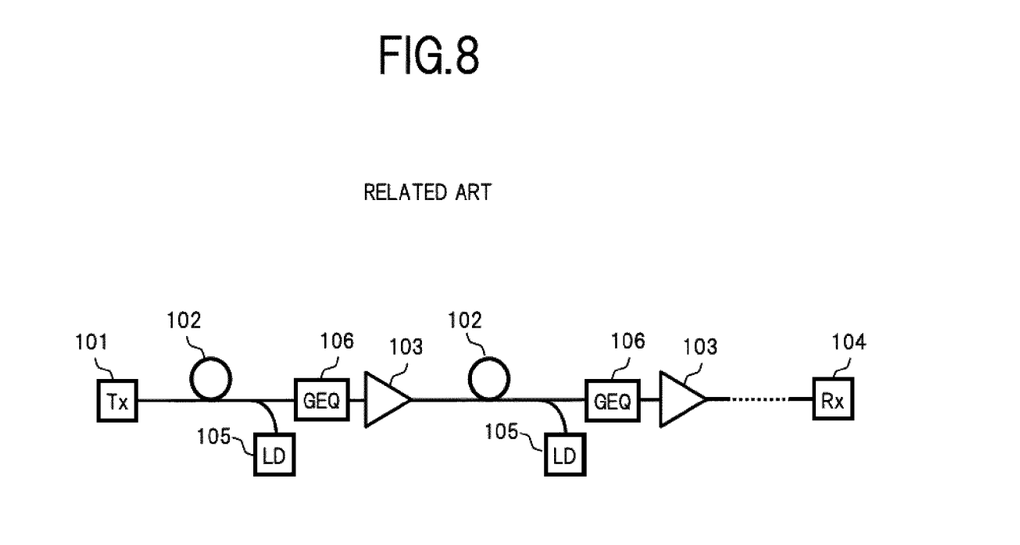
FIG. 8 is a diagram illustrating one example of a conventional system in which the distributed Raman amplifier is applied to each repeating span.

FIG. 8 illustrates one example of an optical amplification-repeating transmission system in which the distributed Raman amplifier is applied to each repeating span. In the system of FIG. 8, a pumping light source (LD) 105 for Raman amplification is disposed to each span, so that a pumping light output from each pumping light source 105 is supplied to a transmission path 102 from a signal output end side.

Figure 9:
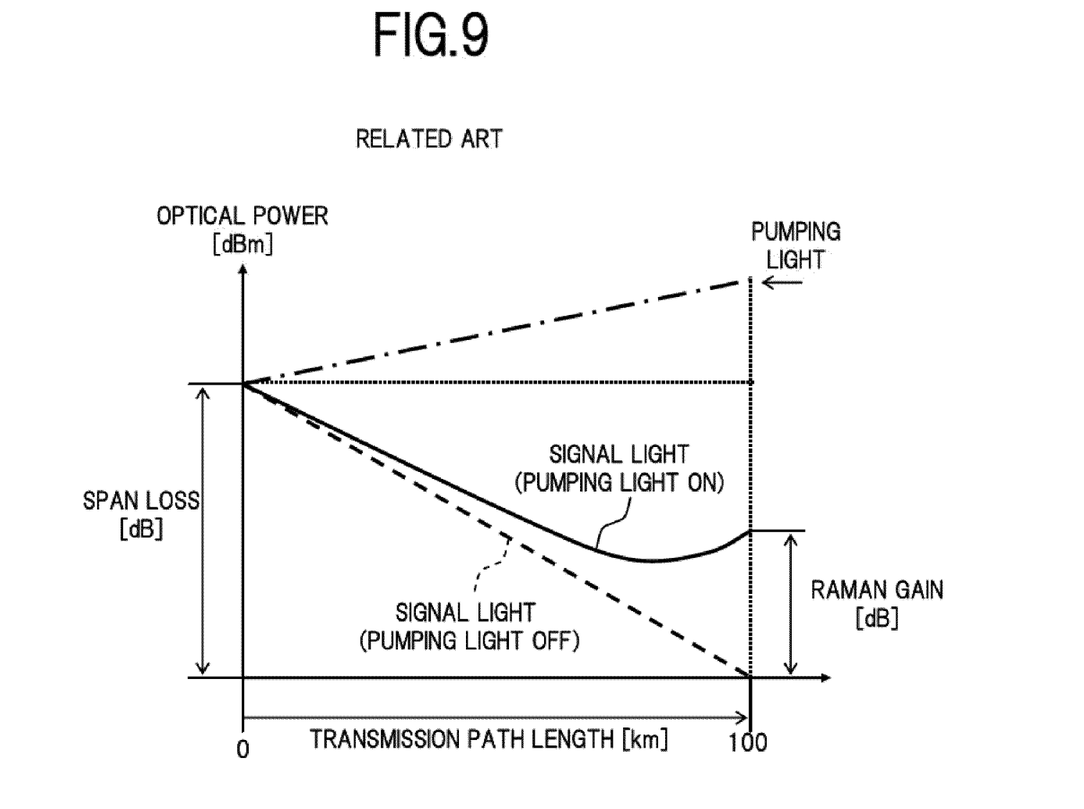
FIG. 9 is a graph for explaining level changes in signal light and pumping light in each span in FIG. 8.

As illustrated in FIG. 9 for example, if the pumping light source 105 is OFF (a broken line in the figure), an optical level of signal light propagated through each span is gradually decreased due to a loss in the transmission path. On the other hand, if the pumping light source 105 is ON (a solid line in the figure), the optical signal is amplified mainly at a latter half of the span due to an effect of stimulated Raman scattering by the pumping light supplied from the signal output end side of the transmission path, so that a part of the loss in one repeating span (span loss) is compensated. A gain of the Raman amplification at the time corresponds to a difference of the optical level for when the pumping light source is ON from the optical level for when the pumping light source is OFF, at the signal output end of the transmission path. Note, a chain line in the figure indicates a change in pumping light level.

As a control method of the distributed Raman amplifier in the system as illustrated in FIG. 8, there has been known an automatic level control (ALC) for controlling a supply state of the pumping light to the transmission path so that an optical output level per one channel in the WDM light which has been propagated through the transmission path to be Raman amplified, is fixed at a previously set target value according to an input dynamic range of the subsequent staged EDFA 103 (refer to Japanese Laid-open Patent Publication No. 2002-076482). Further, there has also been proposed an automatic gain control (AGC) for controlling the supply state of the pumping light to the transmission path so that a Raman gain in each span is fixed at a previously set target value (refer to Japanese Laid-open Patent Publication No. 2008-182679).

However, the distributed Raman amplifier applied with the above conventional control method has the following problems.

Figure 10:
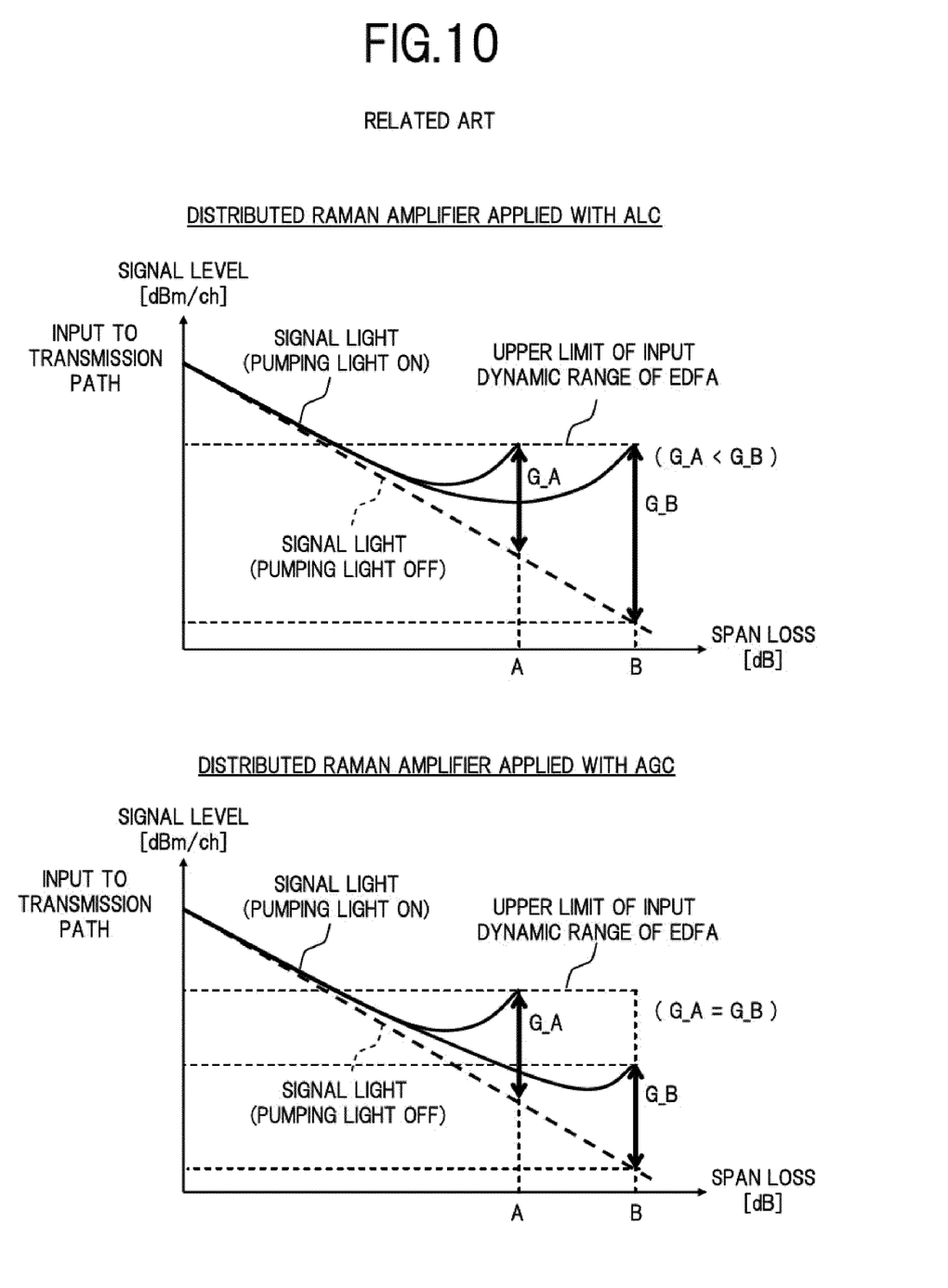
FIG. 10 is a graph for explaining the setting of control target value in the distributed Raman amplifier to which an ALC or an AGC is applied.

In the distributed Raman amplifier applied with the automatic level control (ALC), as illustrated in an upper stage of FIG. 10 for example, the target value of the optical output level is set in the vicinity of an upper limit of the input dynamic range of the WDM optical amplifier so that the OSNR (an average value of the OSNR of each channel) of the WDM light output from the EDFA or the like becomes maximum. Note, a lateral axis in the graph of FIG. 10 represents the span loss. However, if there is a difference between each span loss due to a difference in transmission path length of each span on the system (refer to A point and B point in the figure), the optical output level is fixedly controlled by the ALC of the distributed Raman amplifier, to the difference of the span loss, so that the Raman gain is changed (refer to G_A and G_B in the figure), and therefore, wavelength characteristics of the Raman gain are changed. If the wavelength characteristics of the Raman gain are changed, for example in the case where the wavelength characteristics of the Raman gain in each span are compensated for each span using an optical filter of which transmission wavelength characteristics are fixed (refer to a gain equalization filer (GEQ) 106 illustrated in FIG. 8), a compensation error in this optical filter is increased so that an OSNR of a specific channel among a plurality of channels contained in the WDM light is decreased. Accordingly, since a wavelength worst value of the OSNR is decreased, there is a possibility that transmission characteristics of all channels in the WDM light are hard to be improved.

Further, in the ALC of the distributed Raman amplifier, since the pumping light control is performed by detecting the power per one channel in the WDM light after Raman amplification, information relating to channel numbers of the WDM light is needed. Normally, this channel numbers information is acquired by utilizing an optical supervisory channel (OSC) transferred between nodes. However, since it takes a relatively long time to acquire the channel numbers information, there is a problem in that the ALC at a high-speed is hard to be performed. Further, if the target value of the optical output level is set in the vicinity of the upper limit of the input dynamic range of the EDFA or the like for performing the ALC of the distributed Raman amplifier, since the large pumping light power is needed, the power consumption in the distributed Raman amplifier becomes problematically large.

On the other hand, in the distributed Raman amplifier applied with the automatic gain control (AGC), even if there is the difference of the span loss on the system, since the Raman gain is fixedly held (refer to a lower stage of FIG. 10), the wavelength characteristics of the Raman gain are not practically changed. Therefore, it is possible to effectively suppress inter-wavelength deviation of the OSNR, which is problematic in the ALC. However, in the AGC, since the Raman gain of each span is controlled at the same target value irrespectively of largeness or smallness of span loss, the Raman gain which is same as that of the span in which the OSNR is decreased due to the large span loss, occurs in the span in which the excellent OSNR can be originally obtained since the span loss is small, and consequently, an inefficient control is performed. Namely, the Raman gain effective for improving the received OSNR in the repeating span of large span loss is set for the repeating span of small span loss, and therefore, it is problematically hard to efficiently improve the received OSNR.

SUMMARY

The invention provides, as one aspect thereof, a distributed Raman amplifier which supplies a pumping light to a transmission path to Raman amplify a WDM light being propagated through the transmission path. This distributed Raman amplifier comprises: a pumping light supplying section configured to supply a pumping light output from at least one pumping light source to the transmission path; an OSNR monitoring section configured to monitor an OSNR representing a ratio between a signal light level of each channel contained in the WDM light which has been propagated through the transmission path to be Raman amplified and thereafter is amplified by an optical amplifier in an optical repeating node connected to a signal output end of the transmission path, and a noise light level of each channel contained in the WDM light; a judging section configured to judge whether a monitor value of the OSNR of each channel in the OSNR monitoring section is larger or smaller than a previously set target value thereof; and a control section configured to control a driving state of the pumping light source based on the judgment result in the judging section.

Further, the invention provides, as another aspect thereof, an optical communication system that transmits a WDM light from an optical transmitter to a transmission path, and repeating-transmits the WDM light to an optical receiver while amplifying the WDM light in at least one optical repeating node arranged on the transmission path; and also, is provided with a plurality of distributed Raman amplifiers each of which supplies a pumping light to the transmission path in each repeating span to Raman amplify the WDM light being propagated through the transmission path. In this optical communication system, each of the plurality of distributed Raman amplifiers includes: a pumping light supplying section configured to supply the pumping light output from at least one pumping light source to the transmission path; an OSNR monitoring section configured to monitor an OSNR representing a ratio between a signal light level of each channel contained in the WDM light which has been propagated through the transmission path to be Raman amplified and thereafter is amplified by an optical amplifier in the optical repeating node, and a noise light level of each channel contained in the WDM light; a judging section configured to judge whether a monitor value of the OSNR of each channel in the OSNR monitoring section is larger or smaller than a previously set target value thereof; a control section configured to control a driving state of the pumping light source based on the judgment result in the judging section; and a span loss monitoring section configured to monitor a span loss indicating a loss in the transmission path to which the pumping light is supplied by the pumping light supplying section. The optical communication system further includes: a selecting section configured to select, from a plurality of repeating spans, the repeating span in which the control of the pumping light source is preferentially performed, based on the judging result in the judging section and the monitor result in the span loss monitoring section, which are transmitted from each distributed Raman amplifier; a control target value computing section configured, for the repeating span selected by the selecting section, to correct a control target value of the pumping light source according to an excessive or deficient amount of the monitor value of the OSNR relative to the target value thereof at a reception end, to notify the control target value after correction to the control section of the distributed Raman amplifier in the selected repeating span.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of the invention will be described with reference to drawings. The same reference numerals denote the same or equivalent parts in all drawings.

Figure 1:
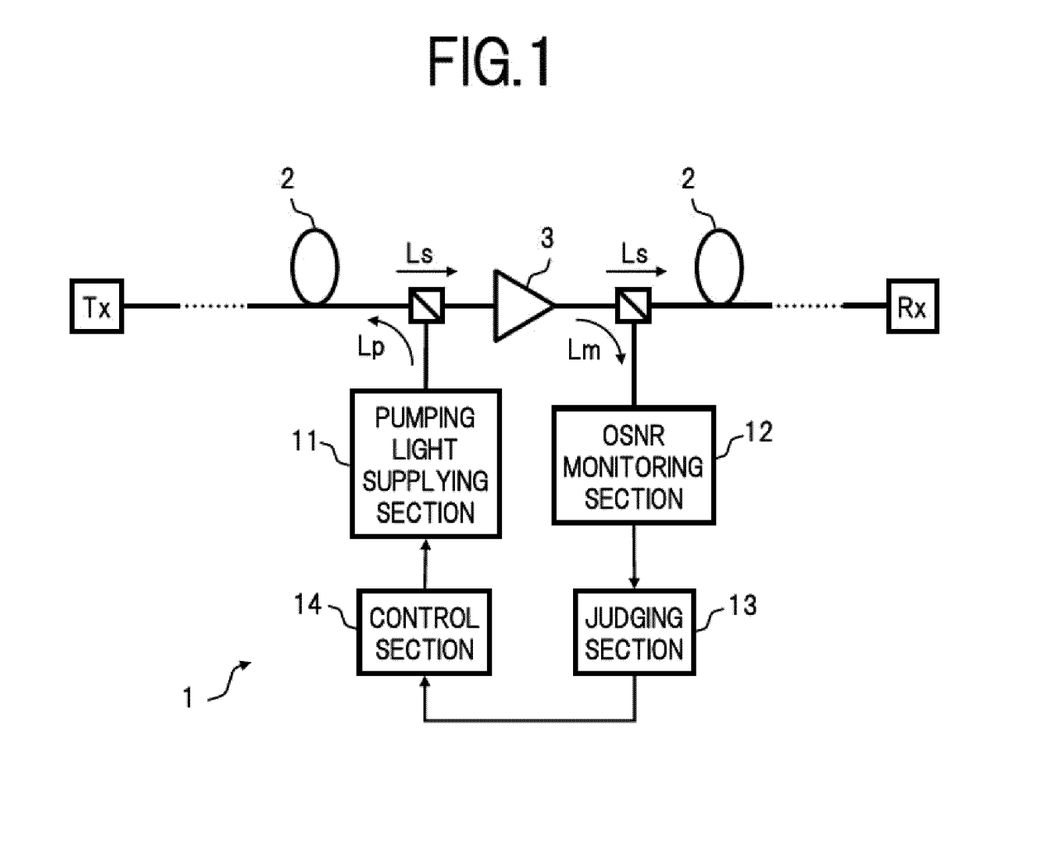
FIG. 1 is a block diagram illustrating a configuration of one embodiment of a distributed Raman amplifier according to the invention.

FIG. 1 is a block diagram illustrating a configuration of one embodiment of a distributed Raman amplifier according to the invention.

In FIG. 1, the distributed Raman amplifier 1 in the embodiment comprises, for example: a pumping light supplying section 11 that supplies a pumping light Lp for Raman amplification to a transmission path 2; an OSNR monitoring section 12 that monitors an OSNR of each channel in a WDM light Ls output from an optical repeating node 3 which is connected to a signal output end of the transmission path 2; a judging section 13 that judges whether a monitor value in the OSNR monitor section 12 is larger or smaller than a previously set target value of the OSNR; and a control section 14 that controls the power of the pumping light supplied to the transmission path 2 from the pumping light supplying section 11.

Incidentally, the optical repeating node 3 is one of a plurality of nodes arranged at required intervals on the transmission path 2 which connects an optical transmitter Tx and an optical receiver Rx in an optical communication system, and is provided with a WDM optical amplifier, such as an EDFA or the like, for amplifying the WDM light which has been propagated through the transmission path 2 to be Raman amplified, up to a required level. Although FIG. 1 illustrates the configuration of one repeating span in the optical communication system, configurations similar thereto will be applied to other repeating spans.

The pumping light supplying section 11 includes, for example, at least one pumping light source of which output wavelength is set according to a wavelength band of the WDM light Ls, and supplies the pumping light Lp output from this pumping light source to the transmission path 2 through a signal output end side thereof. The pumping light Lp supplied to the transmission path 2 is propagated through the transmission path 2 in a direction opposite to a propagation direction of the WDM light Ls. As a result, the WDM light Ls being propagated through the transmission path 2 is amplified due to an effect of stimulated Raman scattering by the pumping light Lp.

The OSNR monitoring section 12 branches a part of the WDM light Ls output from the optical repeating node to the transmission path 2 in the subsequent span, as a monitor light Lm, and detects the powers of signal component and noise component of the monitor light Lm, to compute the OSNR of each channel in the WDM light Ls based on the detection result.

The judging section 13 compares the monitor value of the OSNR computed in the OSNR monitoring section 12 with the previously set target value thereof, to judge whether the monitor value of the OSNR is larger or smaller than the target value thereof, and transmits the judgment result together with a difference between the monitor value and the target value (excess or deficiency of the monitor value relative to the target value) to the control section 14. As the target value of the OSNR, an OSNR value (for example, an OSNR proof strength value of the optical receiver Rx or the like) capable of realizing excellent transmission characteristics at a reception end is used.

The control section 14, if it is judged in the judging section 13 that the monitor value of the OSNR is smaller than the target value thereof, controls the pumping light source in the pumping light supplying section 11 according to the difference (deficiency) of the monitor value of the OSNR from the target value thereof, so that the pumping light power to be supplied from the pumping light supplying section 11 to the transmission path 2 is increased. On the other hand, if it is judged in the judging section 13 that the monitor value of the OSNR is larger than the target value thereof, since a Raman gain enough to realize the transmission characteristics at the reception end is obtained, the control section 14 maintains the current pumping light power to be supplied from the pumping light supplying section 11 to the transmission path 2, or in order to achieve power consumption reduction in the distributed Raman amplifier, controls the pumping light source in the pumping light supplying section 11 according to the difference (excess) of the monitor value from the target value, so that the pumping light power to be supplied from the pumping light supplying section 11 to the transmission path 2 is decreased.

In the control of the pumping light power by the control section 14, if an automatic level control (ALC) is applied, a target output level in the ALC may be corrected according to the excess or deficiency of the OSNR transmitted from the judging section 13. Further, if an automatic gain control (AGC) is applied, a target gain in the AGC may be corrected according to the excess or deficiency of the OSNR transmitted from the judging section 13. However, the correction of the target output power level or the correction of the target gain needs to be performed such that the optical input power to the EDFA or the like in the optical repeating node 3 is converged into an input dynamic range of the EDFA or the like.

Next, there will be described an operation of the distributed Raman amplifier 1 of the above configuration.

In the present distributed Raman amplifier 1, the WDM light Ls which has been propagated through the transmission path 2 to be Raman amplified is fed to the EDFA or the like in the optical repeating node 3 to be amplified, and the OSNR of the WDM light Ls output from the optical repeating node 3 is monitored in real time by the OSNR monitoring section 12. Then, in the judging section 13, it is judged whether the monitor value of the OSNR is larger or smaller than the target value thereof, and the judgment result is transmitted to the control section 14.

In the control section 14, the supply power of the pumping light to the transmission path 2 is adjusted according to the judgment result in the judging section 13, so that the excellent transmission characteristics are realized at the reception end. To be specific, if the monitor value of the OSNR is smaller than the target value thereof, since the level of the optical signal input to the EDFA or the like in the optical repeating node 3 is low, it is judged that the OSNR is decreased, and the power of Raman pumping light is controlled to be increased, to thereby increase the Raman gain in the transmission path 2. As a result, the optical input level to the EDFA or the like in the optical repeating node 3 is increased, so that the OSNR of the WDM light to be sent out from the optical repeating node to the transmission path 2 in the subsequent span is improved.

Further, if the monitor value of the OSNR is larger than the target value thereof, it is judged that the sufficient characteristics are obtained as the quality of the WDM light in the present span, and the control of maintaining the current Raman pumping light power is performed. However, in this control, the OSNR more than necessary is obtained in the present span, namely, the excellent transmission characteristics can be realized at the reception end even if the optical input level to the EDFA or the like in the optical repeating node 3 is decreased from the current optical input level. Therefore, if the monitor value of the OSNR is larger than the target value thereof, it may be judged that the current Raman pumping light power is excessive to thereby control the Raman pumping light power to be decreased until the monitor light of the OSNR becomes equal to the target value thereof. By applying such a control, it becomes possible to decrease the power consumption in the distributed Raman amplifier.

Here, there will be described one example of specific configuration of the distributed Raman amplifier 1 illustrated in FIG. 1.

Figure 2:
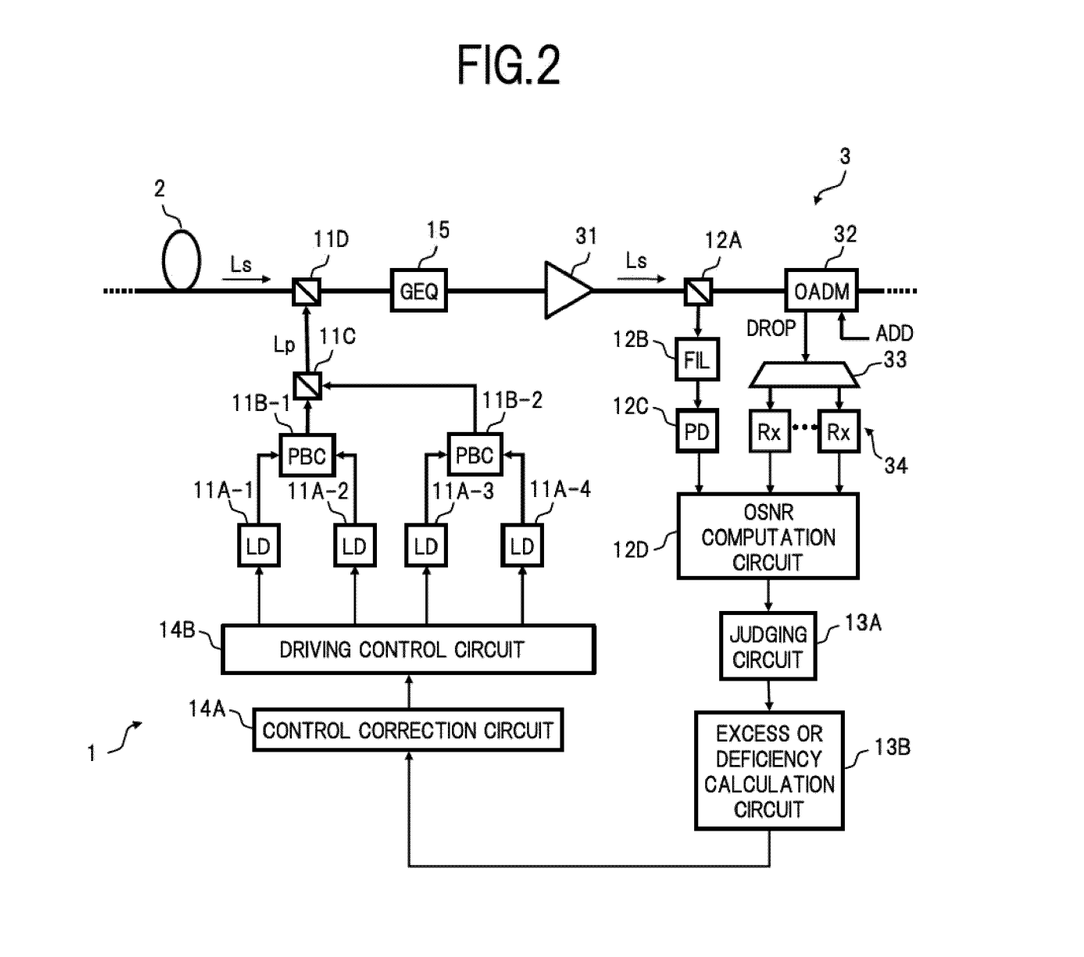
FIG. 2 is a block diagram illustrating a specific configuration example of the distributed Raman amplifier in FIG. 1.

FIG. 2 is a block diagram illustrating a specific configuration example of the distributed Raman amplifier 1.

In the configuration example of FIG. 2, the pumping light supplying section 11 of the distributed Raman amplifier 1 is provided with: four pumping light sources (LD) 11A-1, 11A-2, 11A-3 and 11A-4; two polarization beam combiners (PBC) 11B-1 and 11B-2; a pumping light multiplexer 11C; and a signal light/pumping light multiplexer 11D.

The pumping light sources 11A-1 to 11A-4 are made up, as Raman amplification pumping light sources, by using typical semiconductor lasers (pumping lasers) of which output wavelengths are set to be different from one another, and generate the pumping lights capable of Raman amplifying the WDM light Ls being propagated through the transmission path 2. To the pumping light sources 11A-1 to 11A-4, control signals output from a driving control circuit 14B to be described later in the control section 14 are fed, and driving states thereof are controlled.

The polarization beam combiner 11B-1 combines the pumping lights which are output in different polarization states from the pumping light sources 11A-1 and 11A-2, into one, to output the combined light to one of input ports of the pumping light multiplexer 11C. Further, the polarization beam combiner 11B-2 combines the pumping lights which are output in different polarization states from the pumping light sources 11A-3 and 11A-4, into one, to output the combined light to the other input port of the pumping light multiplexer 11C.

The pumping light multiplexer 11C multiplexes the pumping lights input to the input ports thereof from the polarization beam combiners 11B-1 and 11B-2, into one, to output the multiplexed pumping light Lp to the signal light/pumping light multiplexer 11D.

Incidentally, herein, one example is illustrated in which the pumping lights output from the four pumping light sources 11A-1 to 11A-4 are multiplexed in two stages. However, the number of pumping light sources and the configuration of multiplexing the pumping lights in the distributed Raman amplifier of the invention are not limited to the above example.

The signal light/pumping light multiplexer 11D supplies the pumping light Lp from the pumping light multiplexer 11C to the transmission path 2 from behind (from a signal output end side). The pumping light Lp supplied to the transmission path 2 is propagated through the transmission path 2 in the direction opposite to the propagation direction of the WDM light Ls. Further, the signal light/pumping light multiplexer 11D transmits the WDM light Ls which has been transmitted over the transmission path 2 and a light (noise light, OSC or the like) which is propagated in a direction same as the propagation direction of the WDM signal light Ls, to an EDFA 31 via a gain equalization filter (GEQ) 15.

The gain equalization filter 15 is configured by using an optical filter having fixed transmission wavelength characteristics capable of negating wavelength characteristics (tilting) of the Raman gain for when the pumping light sources 11A-1 to 11A-4 are driven in standard states previously set at designing time.

The EDFA 31 is one constituent element of the optical repeating node 3, and herein, the optical repeating node 3 includes an OADM apparatus 32 in addition to the EDFA 31. The OADM apparatus 32 branches a required channel from the WDM light Ls amplified by the EDFA 31 as a drop light DROP, and inserts an add light ADD into the WDM light Ls to output the WDM light Ls to the transmission path 2 in the subsequent span. The drop light DROP branched by the OADM apparatus 32 is separated into each channel by a demultiplexer 33 using an AWG or the like, and thereafter, each channel are reception processed by each optical receiver (Rx) 34 corresponding thereto. Herein, each optical receiver 34 is provided with a function of detecting the optical power of the reception channel to output it to outside.

On an optical path between the EDFA 31 and the OADM apparatus 32, a branching device 12A configuring the OSNR monitoring section 12 of the distributed Raman amplifier 1 is inserted, and to a branching port of the branching device 12A, an optical filter (FIL) 12B, a light receiving element (PD) 12C and an OSNR computation circuit 12D are connected in this sequence. The branching device 12A branches a part of the light output from the EDFA 31 as a monitor light to feed it to the optical filter 12B. The optical filter 12B is provided with filter characteristics for blocking the signal component corresponding to each channel in the WDM light Ls, while transmitting the noise component, in the monitor light output from the branching device 12A. The light receiving element 12C detects the power of a transmitted light from the optical filter 12B to output a signal indicating the detection result to the OSNR computation circuit 12D. The OSNR computation circuit 12D computes an OSNR (received OSNR) of the channel to be reception processed in the present node by utilizing the output signal from the light receiving element 12C and the output signal from the optical receiver 34 corresponding to each channel of the drop light DROP in the OADM apparatus 32. The computation result is fed to the judging circuit 13A and an excess or deficiency calculation circuit 13B which configure the judging section 13. Note, specific configurations of the optical filter 12B and the light receiving element 12C, and also, the details of the computation process performed in the OSNR computation circuit 12D, will be described later.

The judging circuit 13A compares the monitor value of the received OSNR computed in the OSNR computation circuit 12D with a previously set target value of the received OSNR, to judge whether the monitor value of the received OSNR is larger or smaller than the target value thereof. The excess or deficiency calculation circuit 13B calculates a difference of the monitor value of the received OSNR from the target value thereof. The judgment result in the judging circuit 13A and the calculation result in the excess or deficiency calculation circuit 13B are fed to a control correction circuit 14A in the control section 14.

The control correction circuit 14A corrects a control target value (the target output level for when the ALC is applied or the target gain for when the AGC is applied) of the Raman pumping light, based on a large or small relation and an excessive or deficient amount of the monitor value of the received OSNR relative to the target value thereof, to transmit the correction value to the driving control circuit 14B. The driving control circuit 14B controls the driving states of the pumping light sources 11A-1 to 11A-4 according to the correction value from the control correction circuit 14A.

Figure 3:
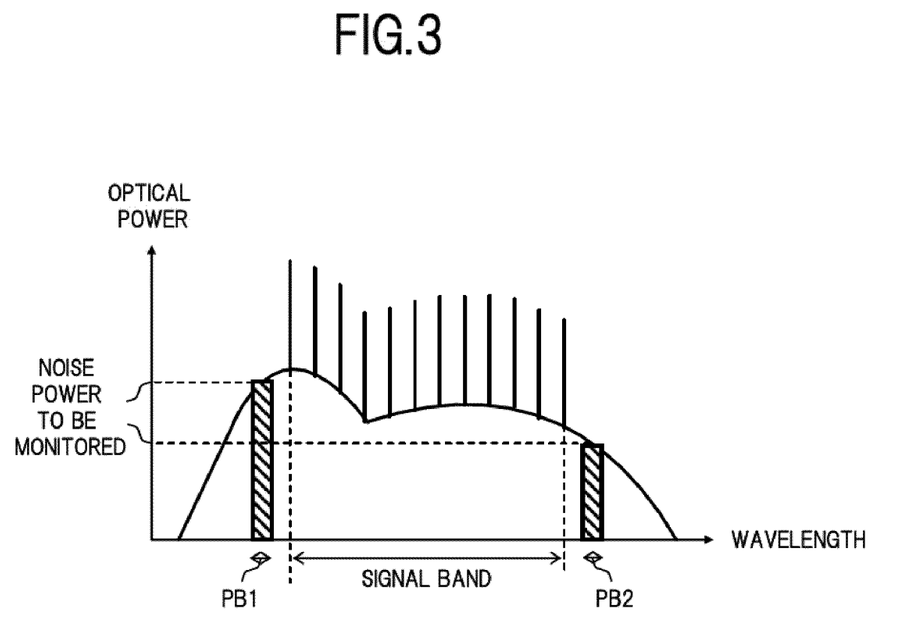
FIG. 3 is a diagram illustrating one example of characteristics of an optical filter which extracts a noise component in the configuration example of FIG. 2.
Figure 4:
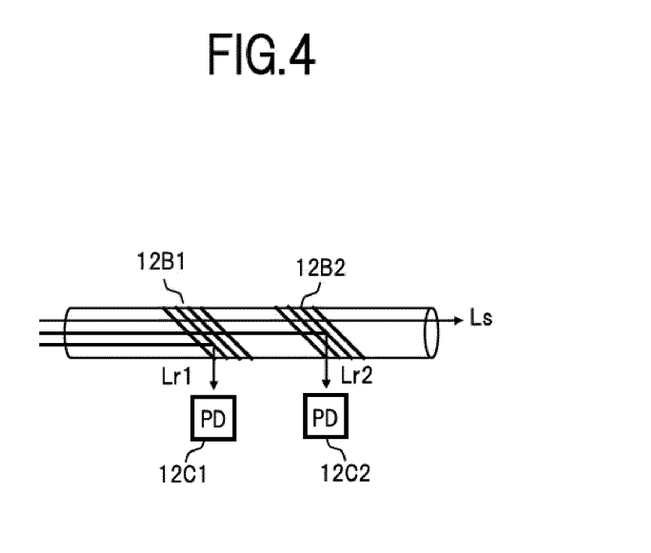
FIG. 4 is a diagram illustrating a specific example of the optical filter realizing the characteristics in FIG. 3.

FIG. 3 is a diagram illustrating one example of filter characteristics of the optical filter 12B. In this example, transmission bands PB1 and PB2 are formed in the vicinity of end portions on a short wavelength side and a long wavelength side of signal band of the WDM light Ls. It is preferable that 3 dB bandwidth of each of the transmission bands PB1 and PB2 is set around several nm. The filter characteristics as described above can be realized with a simple structure by slanted (tilted) fiber gratings 12B1 and 12B2 as illustrated in FIG. 4 for example. In this case, both functions of the branching device 12A and the optical filter 12B in FIG. 2 are realized by the slanted fiber gratings 12B1 and 12B2, and respective wavelength bands of lights reflected by the slanted fiber gratings 12B1 and 12B2 correspond to the transmission bands PB1 and PB2 illustrated in FIG. 3. Reflected light Lr1 and Lr2 from the slanted fiber gratings 12B1 and 12B2 are received by light receiving elements 12C1 and 12C2 corresponding thereto, and the optical powers thereof are detected.

In the case where the optical filter 12 as illustrated in FIG. 3 and FIG. 4 is used, in the OSNR computation circuit 12D, firstly, the optical powers detected in the light receiving elements 12C1 and 12C2 are converted into values each equivalent to wavelength resolution for when the OSNR is calculated. For example, if the 3 dB bandwidth of the transmission bands PB1 and PB2 of the optical filter 12B is 3 nm, and the wavelength resolution for the OSNR calculation is 0.1 nm, the detected powers in the light receiving elements 12C1 and 12C2 are converted into 1/30. Next, a noise light level in the signal band is obtained by calculating an average of the converted values or by linearly approximating a relation of the noise light level relative to the wavelength using the converted values. Then, the received OSNR is calculated in accordance with the following formula (3), using a signal light level of the reception channel indicated by the output signal from the optical receiver 34 and the noise light level corresponding to this reception channel. Received $$\text{OSNR[dB]} = \{\text{signal light level[dBm]} - \text{noise light level} \\ (0.1 \text{ nm converted value})[\text{dBm}] - \text{route loss[dB]}\} - \\ \{\text{noise light level}(0.1 \text{ nm converted value}) \\ [\text{dBm}]\} \quad (3)$$

In the above formula, the route loss is a loss occurring on a signal route between an output end of the EDFA 31 and an input end of the demultiplexer 33, and information relating to the route loss (design value or measurement value) is stored in the OSNR computation circuit 12D in advance.

As described in the above, information relating to the signal light level and the noise light level of the WDM light Ls is acquired at different sites, and the received OSNR is computed in accordance with the formula (3) taking the route loss between the different sites into consideration, and therefore, it becomes possible to monitor the received OSNR in real time with a simple configuration. In comparison of the present monitoring method with a conventional OSNR monitoring method, in the conventional monitoring method, in the case of branching a part of the output power from the EDFA 31 to feed it to an optical spectrum analyzer, to measure the signal light level and the noise light level to thereby monitor the OSNR, in order to separate (distinguish) between the signal light and the noise light, measuring points by fine wavelengths are necessary. Practically, for the broad wavelength band around the signal band, it is necessary to measure the optical power by at least wavelengths finer than the channel spacing of the WDM light Ls. As one specific example, when the measurement by 0.08 nm is performed in a sweep band of 1530 nm to 1565 nm, since the total number of measuring points is 437, it cannot be avoided that a period of time for sweeping the measurement band and a period of time for interpolating to calculate the noise light level based on a large number of measurement data are increased. Therefore, since the conventional OSNR monitoring method utilizing the optical spectrum analyzer lacks high-speed performance, it is difficult to monitor a change in OSNR in real time. Further, the optical spectrum analyzer is in a complicated structure at high cost, and also, is in a large size, and therefore, there is caused a problem in implementing. Contrary to this, in the OSNR monitor configuration illustrated in FIG. 2 to FIG. 4, the signal light level is acquired by utilizing the reception result of the channel dropped by the OADM apparatus 32, and only the noise light level is measured at the different site, so that the computation process of the OSNR is performed. Therefore, the configuration of monitor system can be simplified, and also, the high-speed computation process can be performed.

Incidentally, in FIG. 3 and FIG. 4, one example has been illustrated in which the noise component is extracted at the two sites on the short wavelength side and the long wavelength side outside of the signal band. However, if the bandwidth of the optical filter 12B is sufficiently narrow relative to the channel spacing in the WDM light, the inter-channel noise component in the signal band may be extracted by the optical filter 12B. Further, if the noise component is extracted from at least one wavelength band, the OSNR can be calculated, and therefore, the OSNR can be monitored with higher precision by increasing the noise component extraction sites.

As described in the above, if the received OSNR of the WDM light Ls is monitored in real time by the OSNR computation circuit 12D, it is possible to judge for each channel whether the monitor value of the OSNR is larger or smaller than the target value thereof, to control the driving state of each of the pumping light sources 11A-1 to 11A-4 according to each judgment result. For example, in the case where the AGC is applied for controlling the Raman pumping light, if it is judged that the monitor value of the received OSNR corresponding to each channel is smaller than the target value thereof, it is judged that the received OSNR of each reception channel is decreased since the target gain of the AGC is decreased relative to the span loss in the transmission path 2. In this case, the target gain of the AGC is corrected to be increased according to average deficiency of the received OSNR of each reception channel, and in accordance with the target gain after correction, the output light power of each of the pumping light sources 11A-1 to 11A-4 is increased while basically holding a current power ratio thereof. As a result, the total power of the Raman pumping light to be supplied to the transmission path 2 is increased so that the Raman gain is increased, and the level of the WDM light Ls to be input to the EDFA 31 is increased, so that the received OSNR corresponding to each reception channel can be improved.

On the other hand, in the case where the ALC is applied for controlling the Raman pumping light, if it is judged that the monitor value of the received OSNR corresponding to at least one reception channel is smaller than the target value thereof, it is judged that the received OSNR of this reception channel is decreased due to a compensation error in the gain equalization filter 15 caused by a change in wavelength characteristics of the Raman gain. At this time, if the target output level of the ALC is set in the vicinity of a lower limit or the center of the input dynamic range of the EDFA 31, it becomes possible to improve the received OSNR of the reception channel by correcting the target output level to be increased.

However, if the target output level of the ALC is set in the vicinity of an upper limit of the input dynamic range of the EDFA 31, it is not possible to increase the target output level. In such a case, the pumping light power of a wavelength which mainly undertakes the Raman amplification of the this reception channel (for example, in the case of the reception channel on the short wavelength side, the optical output power of the pumping light source on the short wavelength side among the plurality of pumping light sources) is increased, whereas the pumping light powers of the other wavelengths are decreased, so that only the power ratio in the pumping light power is changed while maintaining the total pumping light power. As a result, the wavelength characteristics of the Raman gain are changed so that the compensation error in the gain equalization filter 15 is decreased, and accordingly, it is possible to improve the received OSNR corresponding to this reception channel.

Further, in the case where the ALC is applied, if it is judged that the monitor value of the received OSNR corresponding to an arbitrary reception channel is larger than the target value thereof, by correcting the target output level of the ALC to be decreased according to the excess of the received OSNR of this reception channel, it becomes possible to achieve the reduction of power consumption while realizing a required received OSNR.

Next, there will be described the optical communication system using the distributed Raman amplifier 1 as described above.

Figure 5:
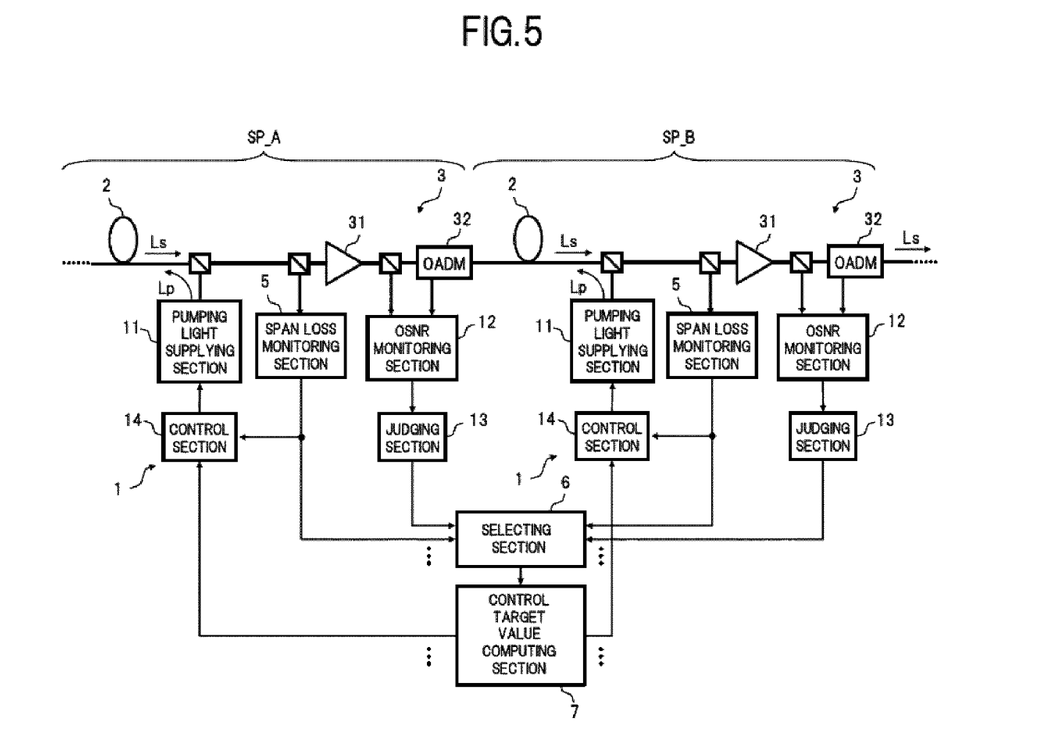
FIG. 5 is a block diagram illustrating a configuration of one embodiment of an optical communication system according to the invention.

FIG. 5 is a block diagram illustrating a main configuration in one embodiment of the optical communication system.

In FIG. 5, spans SP_A and SP_B indicate two repeating spans arranged to be adjacent to each other on the transmission path 2 of the present optical communication system. The spans SP_A and SP_B each is provided with the distributed Raman amplifier 1 and the optical repeating node 3 including the EDFA 31 and the OADM apparatus 31 as described above. Further, a span loss monitoring section 5 is inserted on an optical path between the signal output end of the transmission path 2 and the input end of the EDFA 31. In addition, in the present optical communication system, there are disposed a selecting section 6 and a control target value computing section 7 for centrally administrating the control of the distributed Raman amplifier 1 in each span.

The span loss monitoring section 5 utilizes a reference light different from the WDM light Ls or the Raman pumping light Lp to automatically detect the span loss in the transmission path 2, and outputs the detection result to the selecting section 6 and to the control section 14 of the distributed Raman amplifier in the same span. The reference light which is a light of which wavelength is set within the gain band of the distributed Raman amplifier and also outside of the wavelength band of the WDM light, is fed at required power from the signal input end of the transmission path 2, and the power thereof after propagated through the transmission path 2 is monitored by the span loss monitoring section 5 on the signal output end. The span loss monitoring section 5 utilizes information from a system administrating section (not shown in the figure) or a supervisory signal transferred among each node on the system to acquire the reference light power at the signal input end of the transmission path 2 and information relating to the Raman gain relative to the reference light, and uses the acquired information and the output power of the monitored reference light to obtain the span loss in the present repeating span. Note, such a span loss monitoring method has been known in Japanese Laid-open Patent Publication No. 2008-182679.

The selecting section 6 selects the span for which control of Raman pumping light is to be preferentially performed from the plurality of spans (repeating spans) on the system, based on the judgment result (the large or small relation of the monitor value of the received OSNR relative to the target value thereof and the difference therebetween) in the judging section of the distributed Raman amplifier in each span and the monitor result in the span loss monitoring section 5. The selection of span in the selecting section 6, as described in detail later, is performed with high priority on the repeating span of large span loss, in which the received OSNR can be effectively improved.

The control target value computing section 7 computes the control target value (the target output level for when the ALC is applied or the target gain for when the AGC is applied) of the Raman pumping light for the span selected by the selecting section 6, to notify the computation result to the control section 14 of the distributed Raman amplifier 1 in the selected span.

Next, there will be described an operation of the optical communication system of the above configuration referring to a flowchart in FIG. 6.

Figure 6:
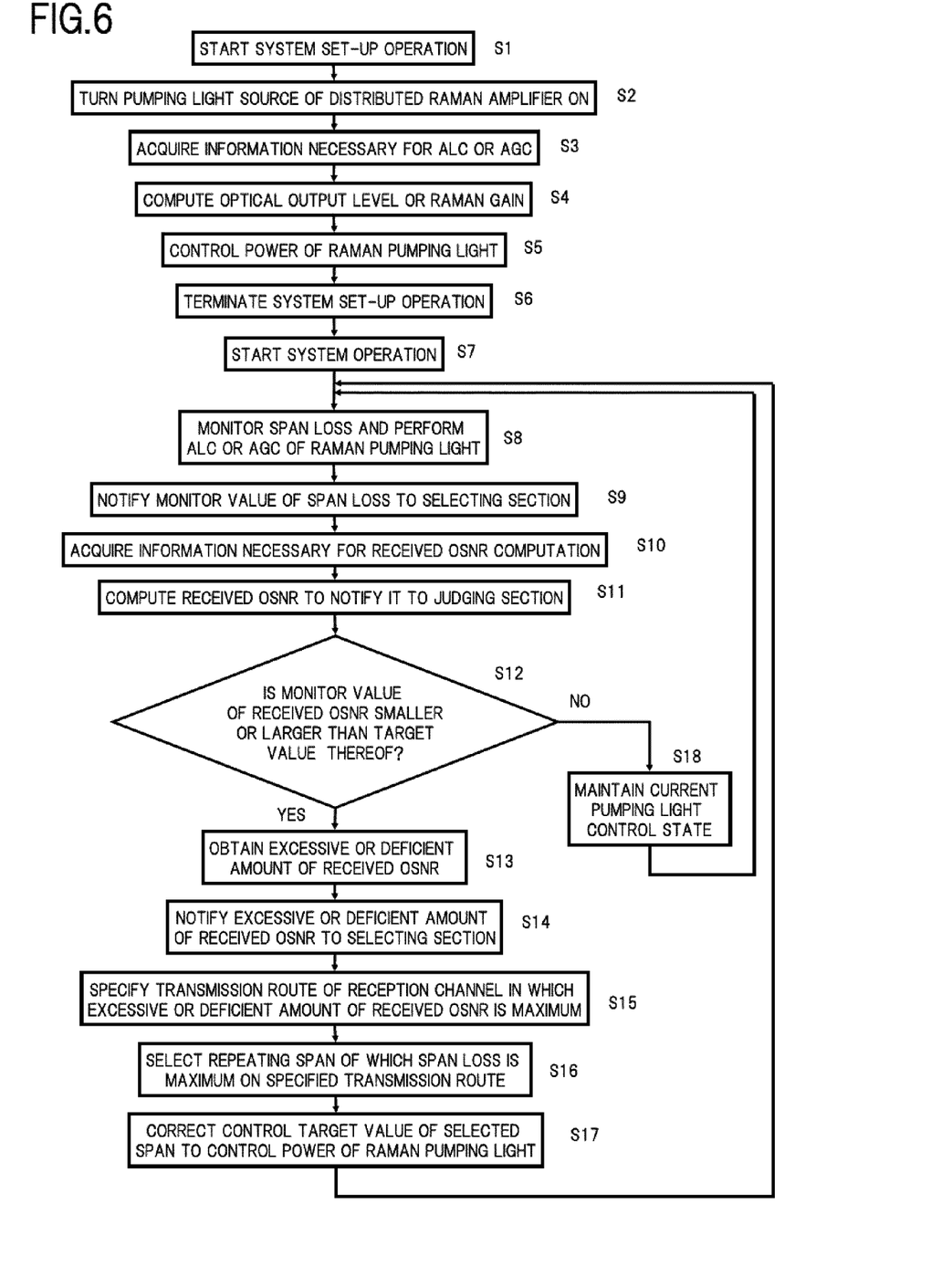
FIG. 6 is a flowchart for explaining an operation of the optical communication system in FIG. 5.

In the present optical communication system, firstly, if a set-up operation of the system is started in step 1 (S1) of FIG. 6, then in step 2, the pumping light source of the distributed Raman amplifier 1 disposed in each span is turned ON, so that the Raman pumping light Lp is supplied to the transmission path in each span. In step 3, a test light equivalent to the WDM light Ls to be transmitted at an operation time is fed to the transmission path 2, and necessary information for performing the ALC or AGC of the pumping light Lp in each span is monitored. In step 4, the optical output level or Raman gain after Raman amplification is computed using the monitored information. In step 5, according to the computation result, the pumping light power in each span is feedback controlled so that the optical output level or the Raman gain in each span reaches a target value (initial value), and if the control in each span is terminated, then in step 6, the set-up operation of the system is ended.

Next, if the transmission/reception of the WDM light Ls is performed after the operation of the system is started in step 7, then in step 8, the span loss in each repeating span is monitored by the span loss monitoring section 5, and also, the ALC or AGC of the Raman pumping light in each span is performed. In step 9, the monitor result in each span loss monitoring section 5 is notified to the selecting section 6 together with the information which enables the present node to be specified. Then, in step 10, the information (the signal output level and the noise light level) necessary for calculating the received OSNR in the OSNR monitoring section 12 in each span is acquired. In step 11, using the information acquired in step 10, the received OSNR of the reception channel in each node is computed and the computation result is transmitted to the judging section 13.

In step 12, in the judging section 13 in each span, it is judged whether the monitor value of the received OSNR is larger or smaller than the target value thereof. If the monitor value of the received OSNR is smaller or larger than the target value thereof, the routine proceeds to step 13. On the other hand, if it is judged that the monitor value of the received OSNR is substantially coincident with the target value thereof, the routine proceeds to step 18 where the current pumping light control state in each span is made to be maintained, and thereafter, the routine returns to step 8.

In step 13, in the judging section 13 in each span, the excessive or deficient amount of the monitor light of the received OSNR relative to the target value thereof is obtained. Then, in step 14, the excessive or deficient amount of the received OSNR obtained in the judging section 13 in each span is notified to the selecting section 6 together with the information which enables the present node and the reception channel to be specified.

In the selecting section 6, firstly in step 15, the reception channel in which the excessive or deficient amount of the received OSNR is maximum in the entire system is judged, and a transmission route of the judged reception channel is specified. Then, in step 16, the priority is set for each span on the specified transmission route in order of large span loss, and the distributed Raman amplifier 1 corresponding to the highest priority span (namely, the repeating span of maximum span loss) is selected as an objective in which the control target value of the pumping light is to be changed (corrected), and then, the selection result is notified to the control target value computing section 7.

In step 17, in the control target value computing section 7, a value obtained by correcting the control target value of the pumping light in the span notified from the selecting section 6 according to the excessive or deficient amount of the received OSNR is computed, and the control target value after correction is notified to the control section 14 of the distributed Raman amplifier 1 corresponding to the selected span so that the pumping light power is controlled. The computation of the control target value and the pumping light power control can be performed as follows according to whether the AGC or ALC is applied to the distributed Raman amplifier 1 in each span.

In the case where the AGC is applied to the distributed Raman amplifier in each span, if it is judged that the monitor value of the received OSNR is smaller than the target value thereof, then in the control target value computing section 7, a value which is obtained by increasing the target gain of the AGC according to the deficiency of the received OSNR is computed. Namely, on the transmission route of the reception channel of smallest received OSNR, the target gain of the AGC in the repeating span of the largest span loss, in which the received OSNR can be effectively improved, is preferentially increased. Incidentally, the current target gains of the AGC in the other repeating spans on the transmission route are basically maintained. Then, the target gain after correction computed in the control target value computing section 7 is notified to the control section 14 in the corresponding distributed Raman amplifier 1, so that the AGC is performed in accordance with the corrected target gain. In this AGC, in the case where the output lights from the plurality of pumping light sources of different wavelengths are multiplexed to be supplied to the transmission path 2 as illustrated in the configuration example of FIG. 2, it is possible to increase the total power of the pumping light Lp to thereby realize the target gain, for example, by increasing the output powers of the pumping light sources while holding the current ratio. Further, the target gain may be realized, for example, by selecting the pumping light source corresponding to the pumping wavelength of largest Raman amplification gain efficiency from the plurality of pumping light sources, to increase the output power of the selected pumping light source (the current output powers of the other pumping light sources are basically maintained). In this case, since the power ratio of the pumping lights of respective wavelengths is changed, although the wavelength characteristics of the Raman gain are changed, such changes are slight since the AGC is basically applied, and accordingly, it is possible to effectively compensate for the wavelength deviation of the Raman gain by the gain equalization filter.

Incidentally, in the above AGC, when the total power of the pumping light reaches the maximum value determined according to stable operation characteristics of the pumping light source or the upper limit of the input dynamic range of the latter staged EDFA 31, since the total power cannot be increased any more, the target gain after correction may not be realized. It is possible to deal with such a case, for example, by notifying the control target value computing section 7 that the pumping light power reaches the maximum value so that, in the control target value computing section 7, a value obtained by increasing the target gain of the AGC in the repeating span of which span loss is the second-largest is computed, to thereby shift the control for increasing the pumping light power in the present span.

On the other hand, in the case where the ALC is applied to the distributed Raman amplifier 1 in each span, if it is judged that the monitor value of the received OSNR is smaller than the target value thereof, then in the control target value computing section 7, it is verified whether the target output level of the ALC in the span notified from the selecting section 6 is set in the vicinity of the lower limit or the center of the input dynamic range of the EDFA 31, and thereafter, a value which is obtained by increasing the target output level of the ALC according to the deficiency of the received OSNR is computed. Namely, for the transmission route of the reception channel of smallest received OSNR, the target output level of the ALC in the repeating span of the largest span loss, in which the received OSNR can be effectively improved, is preferentially increased. Incidentally, the current target output levels of the ALC in the other repeating spans on the transmission route are basically maintained. Then, the target output level after correction computed in the control target value computing section 7 is notified to the control section 14 in the corresponding distributed Raman amplifier 1, so that the ALC is performed in accordance with the corrected target output level.

Incidentally, in the case where the target output level of the ALC in the span notified from the selecting section 6 is set in the vicinity of the upper limit of the input dynamic range of the EDFA 31, in place of computing the correction value of the target output level of the ALC in the control target value computing section 7, the control section 14 in the distributed Raman amplifier 1 corresponding to the notified span is notified that the notified span is selected as an control objective. The control section 14 received this notification increases the pumping light power of the wavelength which mainly undertakes the Raman amplification of the reception channel in which the received OSNR is minimum, while decreasing the pumping light powers of the other wavelengths, to change only the power ratio while maintaining the current total power of the pumping light. When the ALC is applied, as the span loss becomes larger, the Raman gain is increased, and in the span of large Raman gain, a change amount of gain wavelength characteristics relative to the change in power ratio of the pumping lights is also large. Therefore, the distributed Raman amplifier 1 corresponding to the transmission span of largest span loss is preferentially set as the control objective, and the power ratio of the pumping lights is changed while holding the target output level of the ALC to be set in the vicinity of the upper limit of the input dynamic range of the EDFA 31, so that the received OSNR of the reception channel can be effectively improved.

Further, in the case where the ALC is applied to the distributed Raman amplifier 1 in each span, if it is judged that the monitor value of the received OSNR is larger than the target value thereof, in the control target value computing section 7, a value which is obtained by decreasing the target output level of the ALC in the span notified from the selecting section 6 according to the excess of the received OSNR is computed. Note, the target output level is over the lower limit of the input dynamic range of the EDFA 31. As described in the above, when the ALC is applied, as the span loss becomes larger, the Raman gain is increased, and in the span of large Raman gain, the total power of the pumping lights is also large. Therefore, the distributed Raman amplifier 1 corresponding to the transmission span of largest span loss is preferentially set as the control objective, and the target output level of the ALC is decreased to thereby decrease the pumping light power which has been excessively supplied, so that the power consumption in the distributed Raman amplifier 1 can be effectively reduced.

If the process in step 17 is terminated as described in the above, the routine returns to step 8 for repetitively performing the above described series of processes. As a result, it becomes possible to effectively improve the received OSNR of each channel in the WDM light Ls, and also, to efficiently reduce the power consumption in the distributed Raman amplifier 1 in each span.

Incidentally, in the distributed Raman amplifier illustrated in FIG. 2 and the optical communication system illustrated in FIG. 5, the description has been made on the case where the optical repeating node 3 connected to the transmission path 2 in each span includes the OADM apparatus 32, and in the OADM apparatus 32, the arbitrary channel in the WDM light Ls is branched or inserted. However, the invention is not limited thereto, and can be applied to a point-to-point optical communication system which does not include an OADM node. In the case of the point-to-point optical communication system, since each channel in the WDM light passes through all of spans (branching or insertion is not performed during the transmission), it is possible to specify in advance the channel of which received OSNR becomes minimum among each channel in WDM light. For example, in the point-to-point optical communication system in which the wavelength band of the WDM light is a C-band (1530 nm to 1560 nm), and the WDM light which has been Raman amplified in the transmission path is amplified using the EDFA to repeating-transmit the amplified WDM light, the received OSNR of a shortest wavelength (1530 nm) channel in the WDM light of C-band becomes minimum due to NF wavelength characteristics of the EDFA, wavelength characteristics of loss in transmission path, an inter-signal light Raman effect in the transmission path or the like. Therefore, it is possible in the point-to-point optical communication system, to simplify the OSNR monitoring section by monitoring only the received OSNR of shortest wavelength channel, and according to the monitor result, to control the Raman pumping light based on a policy same as that in the above embodiment for the case where the monitor value of the received OSNR is smaller than the target value thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distributed Raman amplifier for supplying a pumping light to a transmission path to Raman amplify a WDM light being propagated through the transmission path, comprising:
a pumping light supplying section configured to supply a pumping light output from at least one pumping light source to the transmission path;
an OSNR monitoring section configured to monitor an OSNR representing a ratio between a signal light level of each channel contained in the WDM light which has been propagated through the transmission path to be Raman amplified and thereafter is amplified by an optical amplifier in an optical repeating node connected to a signal output end of the transmission path, and a noise light level of each channel contained in the WDM light;
a judging section configured to judge whether a monitor value of the OSNR of each channel in the OSNR monitoring section is larger or smaller than a previously set target value thereof; and
a control section configured to control a driving state of the pumping light source based on the judgment result in the judging section,
wherein the pumping light supplying section includes:
a plurality of pumping light sources of different wavelengths; and
a multiplexer configured to multiplex pumping lights output from the respective pumping light sources to supply the multiplexed light to the transmission path, and
the control section is configured to select only the pumping light source which corresponds to a pumping wavelength of which gain efficiency of Raman amplification is largest, among the plurality of pumping light sources, based on the judgment result in the judging section, and then to increase or decrease the output power of the selected pumping light source.

2. A distributed Raman amplifier according to claim 1, wherein if it is judged in the judging section that the monitor value of the OSNR is smaller than the target value thereof, the control section is configured to increase the pumping light power to be output from the pumping light source, according to a deficiency of the monitor value of the OSNR relative to the target value thereof.

3. A distributed Raman amplifier according to claim 2, wherein the control section includes:
a driving control circuit configured to control the driving state of the pumping light source so that a gain of the Raman amplifier in the transmission path is fixed at a previously set target gain; and
a control correction circuit configured to correct the target gain to be increased according to the deficiency of the monitor value of the OSNR relative to the target value thereof, to transmit the target gain after correction to the driving control circuit.

4. A distributed Raman amplifier according to claim 2, wherein the control section includes:
a driving control circuit configured to control the driving state of the pumping light source so that optical output power per one channel of the WDM light propagated through the transmission path is fixed at a previously set target output level; and
a control correction circuit configured to correct the target output level to be increased according to the deficiency of the monitor value of the OSNR relative to the target value thereof, to transmit the target output level after correction to the driving control circuit.

5. A distributed Raman amplifier according to claim 1, wherein if it is judged in the judging section that the monitor value of the OSNR is larger than the target value thereof, the control section is configured to decrease the pumping light power output from the pumping light source according to an excess of the monitor value of the OSNR relative to the target value thereof.

6. A distributed Raman amplifier according to claim 5, wherein the control section includes:
a driving control circuit configured to control the driving state of the pumping light source so that optical output power per one channel of the WDM light propagated through the transmission path is fixed at a previously set target output level; and
a control correction circuit configured to correct the target output level to be decreased according to the excess of the monitor value of the OSNR relative to the target value thereof, to transmit the target output level after correction to the driving control circuit.

7. A distributed Raman amplifier for supplying a pumping light to a transmission path to Raman amplify a WDM light being propagated through the transmission path, comprising:
a pumping light supplying section configured to supply a pumping light output from at least one pumping light source to the transmission path;
an OSNR monitoring section configured to monitor an OSNR representing a ratio between a signal light level of each channel contained in the WDM light which has been propagated through the transmission path to be Raman amplified and thereafter is amplified by an optical amplifier in an optical repeating node connected to a signal output end of the transmission path, and a noise light level of each channel contained in the WDM light;
a judging section configured to judge whether a monitor value of the OSNR of each channel in the OSNR monitoring section is larger or smaller than a previously set target value thereof; and
a control section configured to control a driving state of the pumping light source based on the judgment result in the judging section,
wherein the OSNR monitoring section includes:
a first branching device configured to branch a part of the WDM light amplified by the optical amplifier in the optical repeating node;
an optical filter configured to extract a noise component from the light branched by the first branching device;
a first optical receiving element configured to detect the power of the noise component extracted by the optical filter;
a second branching device configured to branch a part of the WDM light amplified by the optical amplifier in the optical repeating node, at a site different from the branching site by the first branching device;
a demultiplexer configured to demultiplex the light branched by the second branching device to takes out each channel;
a second optical receiving element configured to detect the power of each channel taken out by the demultiplexer; and
an OSNR computation circuit configured to compute the OSNR, based on the detection results in the first and second optical receiving elements and a route loss between the optical amplifier and the demultiplexer.

8. A distributed Raman amplifier according to claim 7, wherein the second branching device is an OADM apparatus included in the optical repeating node; and
the second optical receiving element is an optical receiver which receives each channel demultiplexed by the demultiplexer.

9. A distributed Raman amplifier according to claim 7, wherein the optical filter is a slanted fiber grating.

10. An optical communication system that transmits a WDM light from an optical transmitter to a transmission path, and repeating-transmits the WDM light to an optical receiver while amplifying the WDM light by at least one optical repeating node arranged on the transmission path; and also, is provided with a plurality of distributed Raman amplifiers each of which supplies a pumping light to the transmission path in each repeating span to Raman amplify the WDM light being propagated through the transmission path,
wherein each of the plurality of distributed Raman amplifiers comprises:
a pumping light supplying section configured to supply a pumping light output from at least one pumping light source to the transmission path;
an OSNR monitoring section configured to monitor an OSNR representing a ratio between a signal light level of each channel contained in the WDM light which has been propagated through the transmission path to be Raman amplified and thereafter is amplified by an optical amplifier in the optical repeating node, and a noise light level of each channel contained in the WDM light;
a judging section configured to judge whether a monitor value of the OSNR of each channel in the OSNR monitoring section is larger or smaller than a previously set target value thereof;
a control section configured to control a driving state of the pumping light source based on the judgment result in the judging section; and
a span loss monitoring section configured to monitor a span loss indicating a loss in the transmission path to which the pumping light is supplied by the pumping light supplying section, and
the optical communication system further comprising:
a selecting section configured to select the repeating span in which the control of the pumping light source is preferentially performed from the plurality of repeating spans, based on the judging result in the judging section and the monitor result in the span loss monitoring section, which are transmitted from each distributed Raman amplifier; and a control target value computing section configured, for the repeating span selected by the selecting section, to correct a control target value of the pumping light source according to an excessive or deficient amount of the monitor value of the OSNR relative to the target value thereof at a reception end, to notify the control target value after correction to the control section of the distributed Raman amplifier corresponding to the selected repeating span.

11. An optical communication system according to claim 10, wherein the selecting section is configured to judge the channel in which the excessive or deficient amount of the monitor value of the OSNR relative to the target value thereof at the reception end becomes maximum, among each channel in the WDM light, and to select preferentially the repeating span of which span loss is relatively large, from the respective repeating spans on a transmission route of the judged channel.

12. An optical communication system according to claim 11, wherein the selecting section is configured to select the repeating span of which span loss is maximum, from the respective repeating spans on the transmission route of the judged channel, and if the pumping light power in the distributed Raman amplifier corresponding to the selected repeating span reaches a predetermined value by the control by the control section, to select the repeating span of which span loss is the second-largest, from the respective repeating spans on the transmission route of the judged channel.

13. An optical communication system according to claim 10, wherein when the transmission and reception of the WDM between the optical transmitter and the optical receiver is performed in point-to-point, the OSNR monitoring section provided in each distributed Raman amplifier is configured to monitor the OSNR of one channel among each channel in the WDM light.

* * * * *